3,472,552
LINEAR RETRACTOR FOR SAFETY SEAT BELTS
Thomas Hopka, Bellville, and Robert W. Stoffel, Ferndale, Mich., assignors to Jim Robbins Seat Belt Co., Royal Oak, Mich.
Continuation-in-part of application Ser. No. 608,000, Jan. 9, 1967. This application Feb. 9, 1968, Ser. No. 704,378
Int. Cl. B60r 21/10; A62b 35/82; A47d 15/00
U.S. Cl. 297—388                                                    13 Claims

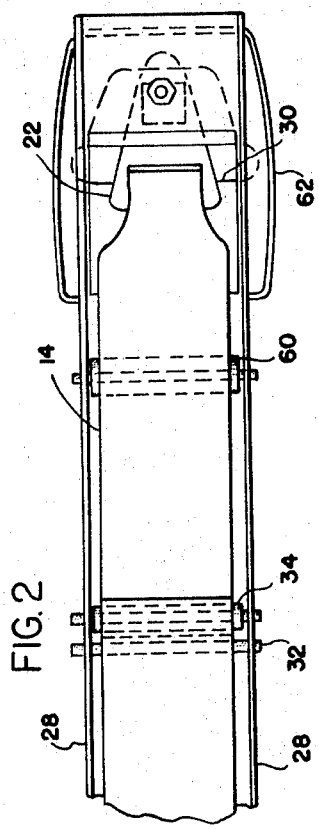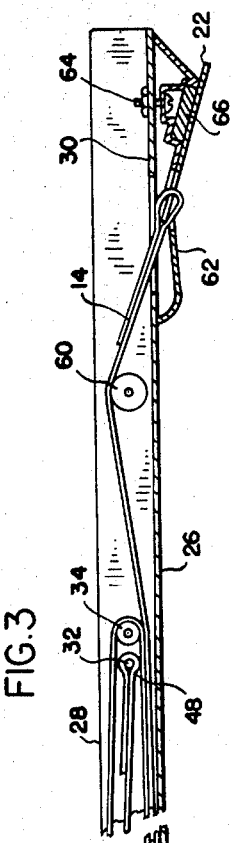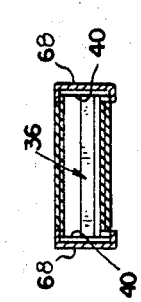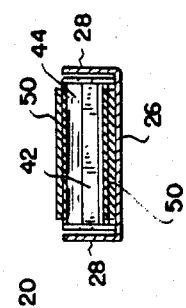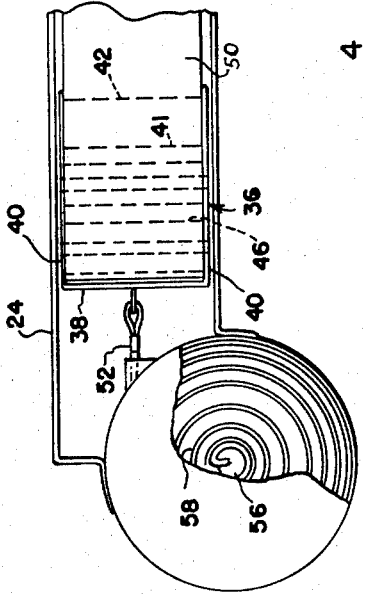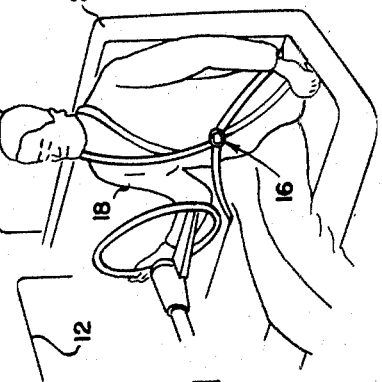

ABSTRACT OF THE DISCLOSURE

A retractor for a seat belt employs an elongated housing having an anchor pin and a fixed roller mounted adjacent a belt-receiving opening. A spring biased truck with a pair of rollers is mounted in the housing for motion toward and away from the anchor pin. The belt is attached to the anchor pin at one end and then wrapped alternately around one of the truck-carried rollers, the fixed roller and the second of the truck carried rollers to form a series of parallel, linear sections. When the free end of the belt is extended away from the housing, the linear sections are reduced in length and pull the truck toward the anchor pin when the free end of the belt is released, the truck, under the influence of a spring, elongates the linear sections to retract the belt into the housing.

CROSS-REFERENCE TO RELATED APPLICATIONS

This application is a continuation-in-part of application Ser. No. 608,000 filed Jan. 9, 1967.

BACKGROUND OF THE INVENTION

Field of the invention

This invention relates to retracting devices for safety seat belts and more specifically to a device for storing a safety seat belt in a series of substantially parallel, linear sections in an elongated housing.

Description of the prior art

Safety seat belts are widely employed in motor vehicles as restraining devices. For appearance and safety reasons, it has been found desirable to provide means in the vehicle for retracting the unused portions of a seat belt into a storage position where the belt is substantially out of sight. Heretofore, the most widely utilized form of retractor has been the reel type which winds the belt into a roll. The reel is biased in a wind-up direction by a yieldable spring so that the user can grasp the free end of the belt and extract it from its stored position.

Recent developments in seat belt devices have indicated that the reel type of retractor has substantial drawbacks in some belt mounting arrangements. Because of its inherent bulk it has been found unsatisfactory when the belt must be stored in an overhead position. This storage position has been suggested for some shoulder belt devices, wherein it is desirable that the belt extend from a position over and behind one shoulder of the user. The bulk of the retractor poses a potential injury-producing hazard in the event the vehicle experiences a collision. In addition, the bulk of overhead mounted, reel type retractors detracts from the interior vehicle appearance.

It is the broad purpose of the present invention to provide an improved retractor means for a safety seat belt which forms the belt into a series of linear, parallel sections for storage in a relatively thin housing.

SUMMARY

The preferred embodiment of the present invention is described with respect to a retractor intended to be attached to an overhead portion of a vehicle for storing a shoulder belt. However, it is to be understood that the preferred retractor can be mounted in other positions within a vehicle such as in the seat back assembly and that it can be combined with various types of belt-locking devices such as the emergency locking device disclosed in my aforementioned copending patent application.

The preferred embodiment employs an elongated, substantially flat housing having an opening for receiving a safety seat belt. The belt is normally biased to a stored position in an elongated guideway within the housing. An anchor pin is mounted in the guideway and a roller is mounted adjacent the anchor pin and in fixed relationship thereto. A truck is slidably mounted in the guideway for movement in directions toward and away from the anchor pin. A pair of rollers carried by the truck are supported for rotation about axes which are parallel to the anchor pin. The belt is attached to the anchor pin and extends from the anchor pin around one of the truck-mounted rollers, then back and around the fixed roller and then in a reverse direction around itself and the second truck-mounted roller from which it issues through the belt-receiving opening. The stored section of the belt is thus formed into a series of linear, substantially parallel sections.

Movement of the truck toward the anchor pin allows the length of the linear sections to be reduced so that the belt can be withdrawn from the housing. As the truck approaches the anchor pin, the belt can be unwrapped from around the rollers. Similarly, movement of the truck away from the anchor pin elongates the linear sections of the belt which in turn withdraws the extended portion of the belt into the housing.

A spring-biased drum mounted on the housing is connected to the truck by a cable which biases the truck away from the anchor pin so that the belt is at all times biased toward a stored position as the truck tends to elongate the linear belt sections. The spring-biased drum is yieldable to a nominal pull-out force so that the operator, by grasping the end of the belt, can extend the belt from the housing.

The preferred retractor can store a substantially long belt into a very narrow space because the overall thickness of the housing is less than an inch. This permits the housing and its associated components to be easily mounted between the headliner and the roof of a vehicle without seriously detracting from the interior vehicle appearance.

It is therefore an object of the present invention to provide a retracting device for a safety seat belt adapted to store the belt into a series of substantially parallel, linear sections.

It is another object of the present invention to provide means for storing a safety seat belt in a relatively flat housing by providing a series of rollers which are supported for movement toward and away from a relatively fixed anchor pin, the belt being wrapped around the rollers into a series of extensible linear sections, with means for biasing the rollers such that the linear sections are elongated to withdraw the belt into the housing while permitting a pull-out force applied to the free end of the belt to extend the belt by moving the rollers toward the anchor pin to reduce the length of the linear sections.

Other objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIGURE 1 is a perspective view of a shoulder belt extended from an overhead retractor illustrating the preferred embodiment of the invention;

FIGURE 2 is an enlarged plan view of the preferred retracting device separated from the vehicle;

FIGURE 3 is an elevational sectional view of the retracting device of FIGURE 2 with parts broken away for purposes of description;

FIGURE 4 is a transverse sectional view through the preferred retractor as seen along lines 4—4 of FIGURE 3; and FIGURE 5 is a transverse sectional view through an alternative form of housing for mounting the truck.

DESCRIPTION OF THE PREFERRED EMBODIMENT

Referring to FIGURE 1, a preferred retractor 10 is shown as mounted on an overhead portion of a vehicle 12. A shoulder belt 14 extends from the retractor 10 and is coupled to a lap belt system 16 for restraining the movement of a body 18 relative to a seat assembly 20. Combination harness and lap belt configurations of this type are well known to those skilled in the art so that a further description will not be provided other than to point out that the shoulder belt 14 is fully extended from the retractor 10 when it is employed as a restraining element. When the belt 14 is not employed as part of the body restraining system, the retractor 10 withdraws the belt into a stored position so that only a metal tongue element 22 carried at the end of the belt is visible.

Now referring to FIGURES 2 and 3, the retractor 10 comprises a relatively flat housing 24 which is mounted between the headliner and the roof of the vehicle 12. The housing 24 is elongated and preferably formed from a metallic sheet into a horizontal base section 26 and a pair of up-turned side sections 28 so that the housing 24 has a generally channel-shaped appearance with the interior of the housing forming an elongated guideway and belt storage area.

A belt-receiving opening 30 is provided in the base 26 of the guideway and adjacent one end of the housing 24.

An anchor pin 32 is mounted on the up-turned sections 28 of the housing near the belt-receiving opening 30. A roller 34 is rotatably supported by the up-turned sections 28 of the housing in fixed parallel relationship to the anchor pin 32. The roller 34 is supported closely adjacent the anchor pin 32 and between the anchor pin and the belt-receiving opening 30.

A truck 36 comprising a transverse section 38 joining a pair of side arms 40 is slidably mounted in the housing for movement toward and away from the anchor pin 32. The side arms 40 are slidably disposed on the flat base 26 and are joined by a reinforcing section 42.

A pair of rollers 44 and 46 are rotatably mounted on the side arms 40 of the truck 36 in spaced parallel relationship to one another. The axis of rotation of the rollers 44 and 46 is parallel to the anchor pin 32 and the roller 34. The roller 44 facing the anchor pin has a lesser diameter than the roller 46.

The end of the belt 14 is stitched into a loop 48 which is attached to the anchor pin 32. The belt extends from the anchor pin 32 and is successively wrapped around the roller 44, back and around the roller 34 and then back and around the roller 46 so that the portion of the belt adjacent its anchored end forms a series of parallel, linear sections 50. It can be seen that movement of the truck 36 toward the anchor pin 32 will permit the length of the linear sections 50 to be reduced and similar movement of the truck 40 away from the anchor pin 32 elongates the linear sections 50.

The truck is biased in a direction away from the anchor pin 32 by a cable 52. The cable is wrapped around the periphery of a circular wind-up drum 54 which is journaled on a pin 56. The pin 56 is attached to the housing and provides means for anchoring the inner end of a helical spring 58. The outer end of the spring 58 biases the drum in a counterclockwise direction. The cable 52 is wrapped around the periphery of the drum which in turn is biased in a wind-up counterclockwise direction as viewed in FIGURE 2 by the spring 58. The spring 58 is yieldable to a nominal pull-out force applied on the belt 14.

It is to be noted that the cable 52 extends tangential from the periphery of the wind-up drum and substantially parallel to the axis of motion of the truck 38 toward and away from the anchor pin 32.

The belt 14 extends from the roller 40 toward the belt-receiving opening 30 and is guided by a guide roller 60 mounted adjacent the belt-receiving opening.

A bezel 62 is attached to the housing by a threaded fastener 64 and adjacent the belt-receiving opening 30. A magnet 66 attached to the bezel 62 by suitable means such as an adhesive attracts the metal coupling 22 carried by the end of the belt and prevents the belt 14 from being completely withdrawn into the housing.

The partially exposed coupling 22 provides handle means enabling the user to readily grasp the end of the belt 14 and extend the belt from the housing.

In operation, when the shoulder belt 14 is uncoupled from the seat belt system 16, the truck 40 under the influence of the spring biased cable 52 moves away from the anchor pin 32. As the truck moves away from the anchor pin, the linear sections 50 elongate and withdraw the extended end of the belt into the housing 26. The belt is withdrawn into the housing until the metal coupling 22 is engaged with the magnet 66.

When the user desires to employ the shoulder belt 14 as a body restraining element, he grasps the coupling 22 and extends it in a direction away from the belt-receiving opening 30 until the belt has extended its full length. As the belt is withdrawn from the housing, the tensile force applied on the belt moves the truck 40 toward the anchor pin so that the linear sections 50 are reduced in length to accommodate the extended portion of the belt. The belt is extended until the arms 40 of the truck abut the anchor pin 32.

FIGURE 5 illustrates another form of housing consisting of a pair of spaced, parallel, channel-shaped members 68 which are joined together by suitable means (not shown). The truck 36 is mounted with the side arms 40 slidably disposed in the channels 68. This alternate form of housing provides advantages in mounting a belt-clamping device where the retractor forms part of emergency actuated retracting assembly.

Having described our invention, we claim:

1. In a safety seat belt assembly adapted for mounting in a vehicle, the combination comprising:
    (a) housing means providing an elongated guideway, and being adapted for mounting on said vehicle, said housing means having a belt-receiving opening connected with said guideway;
    (b) first roller means mounted in said guideway;
    (c) second roller means mounted in said guideway in longitudinally spaced relationship relative to said first roller means, said second roller means being movable in directions toward and away from said first roller means;
    (d) bias means mounted on said housing means for yieldably urging said second roller means away from said first roller means;
    (e) anchor means mounted in said guideway between said first and second roller means, said anchor means being adapted to provide a connection between a safety seat belt and said housing means; and
    (f) a safety seat belt having one end attached to said anchor means, an opposite end extending through said belt-receiving opening, and an intermediate section extending in a first direction from said anchor means toward the second roller means, being doubled around said second roller means, then extending in a reverse direction to form a linear section between said second roller means and said first roller means, then being doubled around said first roller means and extending in said first direction to form a second linear section substantially parallel to said first mentioned linear section; whereby movement of said second roller means away from said first roller means under the influence of said bias means moves the extending end of said belt toward said belt-receiving opening by increasing the length of said linear sections and movement of the extending end of said belt away from said belt-receiving opening reduces the length of said linear sections and causes said second roller means to move toward said first roller means against the influence of said bias means.

2. The invention as defined in claim 1, wherein said second roller means comprises a pair of spaced rollers and said belt extends from said anchor pin and is doubled around a first of said spaced rollers to form a linear section between said first of said pair of rollers and said first roller means and then extends from said first roller means and is doubled around the second of said pair of spaced rollers to form another linear section substantially parallel to said first mentioned pair of linear sections.

3. The invention as defined in claim 2, wherein the nearest of said pair of rollers to said anchor means has a lesser diameter than the second of said pair of rollers.

4. The invention as defined in claim 2, including a truck member disposed in said housing with a pair of spaced side arms slidably mounted in said guideway for motion toward and away from said anchor means, said pair of rollers being rotatably mounted on said side arms.

5. The invention as defined in claim 4, wherein said bias means comprises a spring biased circular drum rotatably mounted on said housing, a cable wrapped around the periphery of said drum and biased by said drum in a wind-up direction, the end of said cable being attached to said truck and biasing said truck away from said anchor means.

6. The invention as defined in claim 5, wherein said cable extends substantially tangential from said drum and parallel to the axis of movement of said truck.

7. The invention as defined in claim 4, wherein said housing is adapted for attachment to an overhead portion of a vehicle and comprises a sheet formed into an elongated, flat base with a pair of up-turned sides, said truck being slidably mounted on said flat base.

8. The invention as defined in claim 4, wherein said housing comprises a pair of spaced, parallel, opposed channel sections, the side arms of said truck being slidably mounted in said channel sections.

9. The invention as defined in claim 1, including interengaging means carried by the extending end of said belt engageable with said belt-receiving opening to prevent the belt from being completely retracted into said housing means.

10. The invention as defined in claim 2, including a guide roller mounted in said housing means adjacent said belt-receiving opening, said guide roller providing means for changing the direction of motion of said belt between said guideway and said belt-receiving opening.

11. The invention as defined in claim 1, wherein said anchor means is mounted in said guideway closely adjacent said first roller means so that said belt forms a linear section between said anchor means and said second roller means.

12. The invention as defined in claim 4, including abutment means disposed in said guideway for terminating the travel of said truck member as the extending end of said belt is moved away from said belt-receiving opening.

13. The invention as defined in claim 4, wherein said anchor means comprises an anchor pin mounted closely adjacent said first roller means, and the travel of said truck member towards said first roller means is terminated when said truck abuts said anchor pin.

References Cited
UNITED STATES PATENTS

| | | | |
|---|---|---|---|
| 3,107,121 | 10/1963 | Mougey | 297—388 |
| 3,222,107 | 12/1965 | Ferrara | 297—388 |
| 3,371,960 | 3/1968 | Bayer et al. | 297—386 |
| 3,400,977 | 9/1968 | Jones | 297—386 |

CASMIR A. NUNBERG, Primary Examiner

U.S. Cl. X.R.
280—150; 297—389